(12) United States Patent
Cook et al.

(10) Patent No.: US 11,157,461 B2
(45) Date of Patent: Oct. 26, 2021

(54) SYSTEMS AND METHODS FOR ACCESSING REMOTE FILES

(71) Applicant: MICROSOFT TECHNOLOGY LICENSING, LLC, Redmond, WA (US)

(72) Inventors: Randall R. Cook, Suwanee, GA (US); Kevin Goodman, Suwanee, GA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 199 days.

(21) Appl. No.: 16/303,583

(22) PCT Filed: May 24, 2017

(86) PCT No.: PCT/US2017/034293
§ 371 (c)(1),
(2) Date: Nov. 20, 2018

(87) PCT Pub. No.: WO2017/205520
PCT Pub. Date: Nov. 30, 2017

(65) Prior Publication Data
US 2020/0319903 A1 Oct. 8, 2020

Related U.S. Application Data

(60) Provisional application No. 62/340,761, filed on May 24, 2016.

(51) Int. Cl.
*G06F 16/188* (2019.01)
*G06F 9/455* (2018.01)
(Continued)

(52) U.S. Cl.
CPC .......... *G06F 16/196* (2019.01); *G06F 9/452* (2018.02); *G06F 9/45558* (2013.01);
(Continued)

(58) Field of Classification Search
CPC ...... G06F 9/45558; G06F 9/452; G06F 9/542; G06F 9/546; G06F 16/188; G06F 16/13; G06F 2009/45579; G06F 2009/45595
See application file for complete search history.

(56) References Cited

U.S. PATENT DOCUMENTS 6,381,615 B2   4/2002   Gaither et al.
8,171,066 B2   5/2012   Isaacson et al.
(Continued)

OTHER PUBLICATIONS

CH Fogelberg, "An object-oriented database for advanced searches of file systems based on metadata", 2011, Technical University of Denmark (Year: 2011).*
(Continued)

*Primary Examiner* — Jacob D Dascomb
(74) *Attorney, Agent, or Firm* — Newport IP, LLC; Leonard J. Hope (57) ABSTRACT

The present systems and methods generally relate to the elimination or reduction of network traffic required to support operations on a file of any size stored remotely on a file server or network share. More particularly, the present systems and methods relate to encapsulation of a remote file in such a way that the file appears to the local operating system and any local applications to be residing locally, thus overcoming some of the performance issues associated with multiple users accessing a single network share (e.g., CIFS share) and/or a single user remotely accessing a large file.

20 Claims, 6 Drawing Sheets

(51) Int. Cl.
*G06F 9/451* (2018.01)
*G06F 9/54* (2006.01)
*G06F 16/13* (2019.01)

(52) U.S. Cl.
CPC .............. *G06F 9/542* (2013.01); *G06F 9/546* (2013.01); *G06F 16/13* (2019.01); *G06F 16/188* (2019.01); *G06F 2009/45579* (2013.01); *G06F 2009/45595* (2013.01)

(56) References Cited

U.S. PATENT DOCUMENTS

| | | | |
|---|---|---|---|
| 8,244,989 B2 | 8/2012 | Benavides | |
| 8,312,212 B2 | 11/2012 | Tolba | |
| 8,775,781 B2 | 7/2014 | Warkentin et al. | |
| 9,864,625 B2 * | 1/2018 | Chawla | G06F 16/182 |
| 2012/0054742 A1 | 3/2012 | Eremenko et al. | |
| 2012/0124581 A1 * | 5/2012 | Nitta | G06F 8/65 718/1 |
| 2012/0174096 A1 | 7/2012 | Conover | |
| 2015/0040181 A1 | 2/2015 | Cook et al. | |
| 2015/0254092 A1 * | 9/2015 | Chandrasekaran | G06F 9/45558 718/1 |

OTHER PUBLICATIONS

"International Search Report and Written Opinion Issued in PCT Patent Application No. PCT/US2017/034293", dated Aug. 4, 2017, 11 Pages.

"Search Report Issued in European Patent Application No. 17803517.6", dated Dec. 16, 2019, 8 Pages.

* cited by examiner

FIG 1: EXEMPLARY SYSTEM ARCHITECTURE

FIG 2: EXEMPLARY PROCESS OVERVIEW

FIG 3: EXEMPLARY SERVICE SETUP PROCESS

FIG 4: EXEMPLARY USER LOGON PROCESS

FIG 5: EXEMPLARY USER CONFIGURATION PROCESS

FIG 6: EXEMPLARY USER LOGOFF PROCESS

SYSTEMS AND METHODS FOR ACCESSING REMOTE FILES

CROSS-REFERENCE TO RELATED APPLICATIONS

This application is a national stage application, filed under 35 U.S.C. § 371, of International Patent Application No. PCT/US2017/034293, filed on May 24, 2017, entitled "Systems and Methods for Accessing Remote Files," which claims the benefit under 35 U.S.C. § 119 of, and priority to, U.S. Provisional Patent Application No. 62/340,761, filed on May 24, 2016, also entitled "Systems and Methods for Accessing Remote Files," which is hereby incorporated by reference in its entirety.

TECHNICAL FIELD

The present systems and methods generally relate to improving computer systems by the elimination or reduction of network traffic required to support operations on a file of any size stored remotely on a file server or network share.

BACKGROUND

A computer's operating system, such as the Microsoft® Windows® operating system ("Windows"), may be configured to specify that files residing on remote systems may be accessible to a user of the operating system. The Windows protocol that accesses these remote systems (sometimes called "network shares") is typically Server Message Block ("SMB") protocol, which is commonly referred to as Common Internet File System ("CIFS"). A CIFS share performs poorly when multiple users access multiple files on the same CIFS share or when a single user is accessing a large file, such as the offline storage table (OST) file that MICROSOFT® OUTLOOK® uses to store email messages and data. In some instances, such large files may be stored on a user's local computer. However, in other instances, such as in virtual desktop infrastructure ("VDI") or Remote Desktop Session Host ("RDSH") systems, it is either not possible or impractical to persist a large file or an OST file locally (e.g., because the software does not permit this type of storage or the file is too large).

Thus, there is a need for systems and methods that enable users to more efficiently access large files such as an OST file from a single CIFS share. There is also a need for systems and methods that allow multiple users of VDI or RDSH systems to access a single CIFS share with improved performance.

BRIEF SUMMARY OF THE DISCLOSURE

The present systems and methods generally relate to the elimination or reduction of network traffic required to support operations on a file of any size stored remotely on a file server or network share. More particularly, the present systems and methods relate to encapsulation of a remote file in such a way that the file appears to the local operating system and any local applications to be residing locally, thus overcoming some of the performance issues associated with multiple users accessing a single network share (e.g., CIFS share) and a single user remotely accessing a large file.

Remote desktop virtualization has changed the way large scale computing systems are distributed and managed. In general, remote desktop virtualization allows for the software execution to take place on a remote server, while a client device (e.g., a PC/laptop, smartphone, tablet, etc.) provides the input for navigating the software. In a remote desktop virtualization environment, a user may access a computing device and be presented with a desktop or work station environment that appears to be delivered by that particular computing device; however, that desktop or workstation environment is being serviced by a remote server and the particular computing device is merely providing the input for controlling the environment.

One challenge presented by remote desktop virtualization is network congestion. For example, the widely used enterprise software Microsoft® Office 365 Commonly enables a cache exchange mode (CME), wherein a copy of the user's mailbox is locally saved to the user's computer as an .OST file, which allows offline use of the software as well as overall faster lookup speeds. Typically, the .OST file will include a history of emails, contacts, calendar events, etc., and as a result, the size of an .OST file is generally very large and may become larger as the user's mailbox grows. In a virtual desktop infrastructure, the remote server may push large amounts of data (e.g., .OST files) to a plurality of computing devices during login/logoff (and often around the same time). In this situation (and others), not only does the network become congested, but also the virtual desktops are usually not equipped to locally store the data. These, and similar issues, are shared among other robust software packages used in virtual desktop infrastructures.

A well-known previous solution to these issues is to physically bolster the network by increasing bandwidth, or implementing higher grade server hardware such as SSD (solid state drive) and high performance NAS (network attached storage). In addition to being costly, these solutions do not address the root of the issue but merely attempt to patch it. Another work-around includes redirecting the .OST file to the user's home drive on a network share, thereby placing the burden of the large file size on the home drive and not the virtual desktop. This scenario may remedy some storage issues, but falls short of providing the user with the optimized computing performance that is realized when the .OST is locally saved.

As mentioned above, the present systems and methods look to overcome the above challenges and improve upon computing systems and techniques for remotely accessing large files. In particular, according to particular embodiments, the present disclosure is directed to a computer-implemented method for improving computing functionality by elimination or reduction of network traffic, the method including: 1) encapsulating a VHD file in a virtual hard drive, the file associated with a program to be run on a user's computing device, wherein the user's computing device is running an operating system; 2) attaching the virtual hard drive to the user's computing device; 3) determining a target file to be changed, the target file associated with the program to be run on the user's computing device; 4) changing the path of the target file such that it is hidden from the operating system; and 5) upon receiving an indication from the operating system to run the program, directing the operating system to access the VHD file.

According to at least one embodiment, the present disclosure is directed to a system for improving computing functionality by elimination or reduction of network traffic, the system including a memory storing an operating system and at least one processor for executing computer-implemented instructions of the operating system, wherein the operating system is configured to implement a service by performing the steps of: 1) receiving a request to attach a virtual hard drive including a VHD file, the VHD file associated with a program to be run on a user's computing device; 2) attaching the virtual hard drive to the user's computing device; 3) determining a target file to be changed, the target file associated with the program to be run on the user's computing device; 4) changing the path of the target file such that it is hidden from the operating system; and 5) upon receiving an indication from the operating system to run the program, directing the operating system to access the VHD file.

These and other embodiments, features, and benefits of the claimed invention(s) will become apparent from the following detailed written description of the preferred embodiments and embodiments taken in conjunction with the following drawings, although variations and modifications thereto may be effected without departing from the spirit and scope of the novel concepts of the disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Further, one or more references are incorporated by reference herein. Any incorporation by reference is not intended to give a definitive or limiting meaning of a particular term. In the case of a conflict of terms, this document governs.

Overview

This application incorporates by reference U.S. patent application Ser. No. 14/446,983, entitled "MANAGING CONFIGURATIONS OF COMPUTING TERMINALS", filed on Jul. 30, 2014, the disclosure of which is incorporated by reference as if the same were fully set forth herein.

Embodiments of the present disclosure generally relate to the elimination or reduction of network traffic required to support operations on a file of any size stored remotely on a file server or network share. More particularly, the present systems and methods relate to encapsulation of a remote file in such a way that the file appears to the local operating system and any local applications to be residing locally, thus overcoming some of the performance issues associated with multiple users accessing a single network share (e.g., CIFS share) and/or a single user remotely accessing a large file.

According to particular embodiments, the systems and methods disclosed herein are directed to a service that runs on a user's computer and makes particular changes to the user's system, directing the operating system to remote files opposed to local files or CIFS shares. For example, a large file, such as a MICROSOFT® OUTLOOK® data file may be encapsulated in a virtual hard drive ("VHD"). Continuing with this example, the service running on the user's computer may be configured to modify the MICROSOFT® OUTLOOK® data file default folder on the user's system, such that the operating system is directed to access the encapsulated MICROSOFT® OUTLOOK data file on the VHD instead.

In particular embodiments, the service disclosed herein, for example, renames the existing folder "C:\users\<username>\AppData\Local\Microsoft\Outlook" on a user's computing device to "C:\users\<username>\AppData\Local\Microsoft\Outlook.hold". The service then, in this embodiment, creates a junction at C:\users\<username>\AppData\Local\Microsoft\Outlook that points to the VHD with the encapsulated MICROSOFT® OUTLOOK® data file. In this way, in this embodiment, when the user's operating system searches for C:\users\<username>\AppData\Local\Microsoft\Outlook, it is redirected to the MICROSOFT® OUTLOOK® data file in the VHD and the original data located at C:\users\<username>\AppData\Local\Microsoft\Outlook is now "hidden" from the operating system at C:\users\<username>\Appdata\Local\Microsoft\Outlook.hold.

Various aspects of the above process will be discussed in further detail below. Prior to discussing exemplary processes, we will discuss an exemplary architecture and service components, below.

Exemplary Architecture

As discussed herein, the present systems and methods relate to encapsulation of a remote file in such a way that the file appears to the local operating system and any local applications to be residing locally. In particular embodiments, a service is implemented within an operating system environment to perform this functionality. In some embodiments, the service intercepts requests, such as Input/Output (JO) requests or registry requests, evaluates rules based on the intercepted requests during runtime, and/or performs actions based on the rule evaluations, such as passing requests through, redirecting requests, modifying requests, hiding resources, or performing other actions.

This service may be implemented in one or more of the terminal's file system filter drivers and registry filter drivers as a terminal configuration management service. In some embodiments, the terminal configuration management service is implemented as, or is configured with the functionality of, a file system filter driver and a registry filter driver (referred to herein as a "file and registry filter driver" (FRXDRV)).

Figure 1:
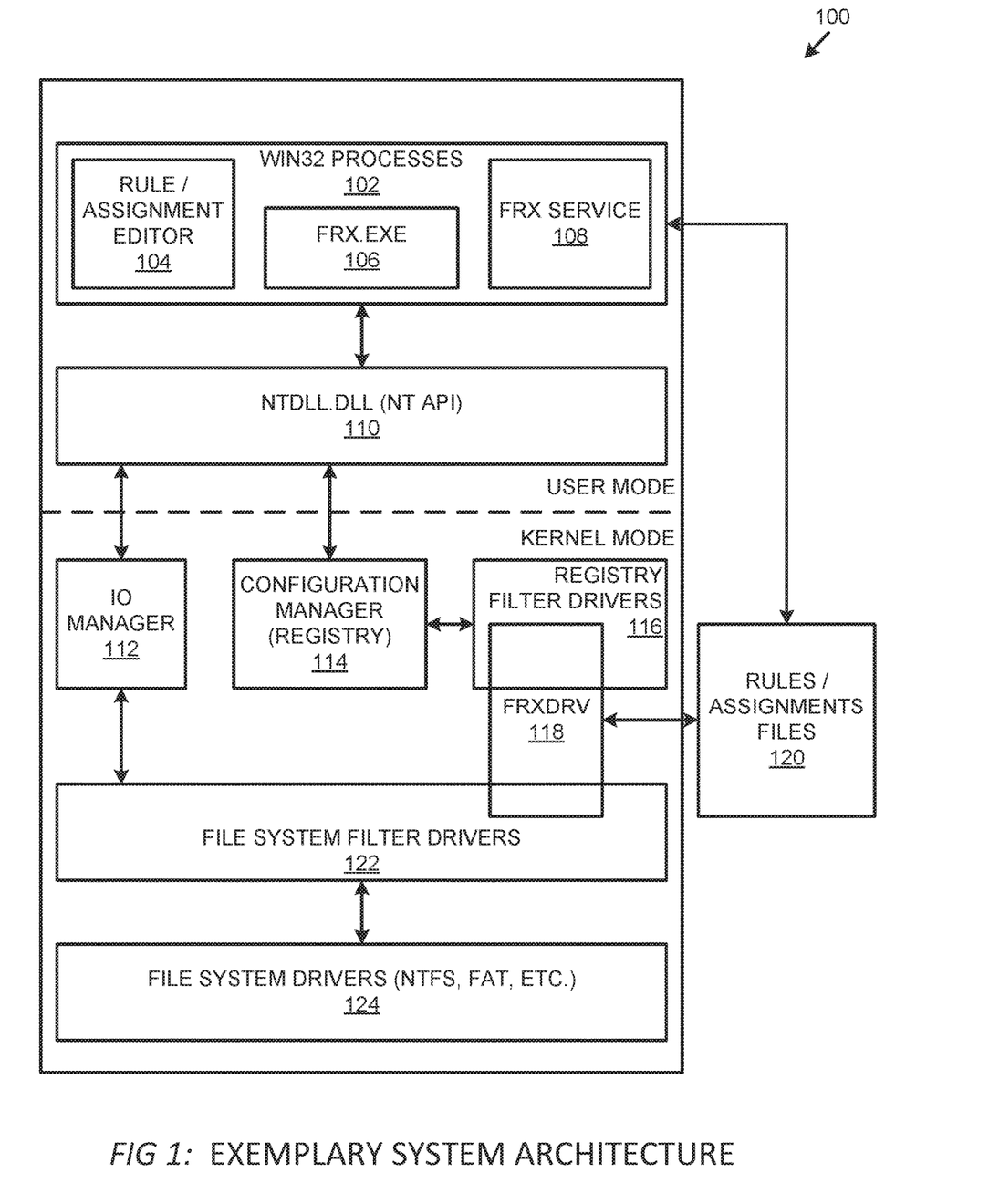
FIG. 1 is an exemplary architecture, according to one embodiment of the present disclosure.

FIG. 1 is a simplified block diagram of an embodiment of a typical Windows NT-based operating system structure 100, including Win32 processes 102 (rule/assignment editor 104, FRX.EXE 106, and FRX Service 108), an NTDLL.DLL 110, an IO Manager 112, a configuration manager (registry) 114, registry filter drivers 116, file system filter drivers 122, and file system drivers 124. Win32 processes 102 are the applications and services that are running on a Windows terminal. Win32 processes initiate calls to the file system drivers 122 (which interact with the underlying file system) and the configuration manager 114 by calling Win32 APIs (not shown), such as CreateFile, RegOpenKey, etc. The Win32 API layer in turn calls corresponding user mode NT APIs (not shown) in the NTDLL.DLL 110, which provides the native Windows NT API set. For example, NTDLL.DLL 110 includes user mode Windows NT APIs like NtCreateFile, NtOpenKey, etc. User mode NT APIs typically match up one-to-one with a kernel mode API. For example, NtCreateFile maps to the ZwCreateFile API.

In some embodiments, a rule/assignment editor tool 104, which may be implemented as a program module, plug-in, script, or any other executable Win32 process, may be provided to facilitate the creation and modification of rules and assignments. The rule/assignment editor tool 104 may, in some embodiments, be a GUI-based tool. Alternatively or additionally, a command line component FRX.EXE 106, can be provided for creating and adding rules/assignments, deleting rules/assignments, triggering reloads of rules/assignments files 120 by the FRXDRV 118, etc. These components may be provided on the computing terminal where the FRXDRV 118 is executed and/or may be provided on an administrator terminal such that the rules/assignments files 120 can be distributed to any number of computing terminals.

A file and registry filter service (FRX Service) 108 may also be provided to operate in conjunction with the FRXDRV 118. The FRX Service 108 may be implemented as an executable or other program module. This service may be configured to accept commands from the command line component FRX.EXE 106 and/or the rule/assignment editor tool 104, compile rules/assignments files 120 from user format to driver format, watch for updates to rules/assignments file(s) 120 appear, and notify the FRXDRV 118 when such updates are detected. As such, the FRX Service 108 may be provided on the computing terminal where the FRXDRV 118 is executed and/or on an administrator terminal. For example, the FRX Service 108 may determine that new rules/assignments files 120 have been created, compile those files and store them in a folder or other location accessible to the FRXDRV 118. The FRX Service 108 may then notify the FRXDRV 118 that there are new rules/assignments files 120 to process.

In various embodiments, the IO manager 112 takes the parameters passed to a particular function and creates a corresponding Interrupt Request Packet (IRP). In particular embodiments, an IRP is a memory structure that contains all of the information about the request that will be passed to lower components within the operating system. In some embodiments, file system filter drivers (FSFDs) 122 are kernel components that are loaded and inserted into the communication path between the IO manager 112 and the file system drivers 124. FSFDs 122 essentially "intercept" all IO within the operating system before it gets to the file system drivers 124. FSFDs 122 can also actively modify IO requests or complete IO requests themselves. There are several classes of FSFDs 122 like antivirus, undelete, backup, virtualization, activity monitoring, etc. FSFDs 122 can be implemented in a stack with a configurable priority among them. In some configurations (e.g., in Windows 7 and later versions of the Windows NT operating system), a FSFD 122 may be implemented as a filter manager that provides for the creation and management of "mini-filter drivers," which can perform functions such as antivirus, undelete, backup, virtualization, activity monitoring, etc.

According to some embodiments, the configuration manager 114 implements the registry and handles all registry API calls and stores the registry information in multiple database files. In at least one embodiment, the configuration manager 114 provides a filtering interface that allows for the implementation of registry filter drivers 116. In particular embodiments, a registry filter driver 116 is a kernel component that registers with the configuration manager 114 to intercept, handle and possibly modify registry calls. Registry filter drivers 116 can thus be configured as registry 10 handlers.

In the embodiment shown, the FRXDRV 118 is configured to perform the functionality described with respect to FIGS. 2-6 and elsewhere herein, is implemented within the FSFD 122 stack and the registry filter driver 116 stack. For example, portions of the FRXDRV 118 may be implemented as a FSFD 122 (or a mini-filter driver) and portions may be implemented as a registry filter driver 116. Other implementations of the FRXDRV 118 will also be apparent to those of skill in the art.

Thus, IO requests handled by the 10 manager 112 and registry 10 requests handled by the configuration manager 114 can be intercepted and handled by the FRXDRV 118. In various embodiments, as will be described in more detail, the functionality provided by the FRXDRV 118 allows an administrator to "hide" the presence of a directory, file, registry key, registry value or other resource (e.g., a MICROSOFT® OUTLOOK® data file). These objects may remain stored within the local memory of the terminal, but are hidden from the user. In some embodiments, FRXDRV 118 creates a junction that redirects an operating system to a new directory, file, or resource (such as a VHD). In further embodiments, FRXDRV 118 attaches or detaches one or more VHDs.

The FRXDRV 118 can be configured to hide different resources or types of resources for different users, for example based on access authorization credentials or other criteria assigned to or associated with a user or group of users. For example, different sets of resources may be hidden for different users or different groups of users, who each may therefore have a significantly different view of the same computing terminal. In some embodiments, the FRXDRV 118 may be configured to hide different resources or types of resources for or during different processes, threads, sessions, etc. In some embodiments, the FRXDRV 118 may be configured to start or stop hiding certain resources, change file names, and/or attached/detach VHDs based on trigger events such as schedule, location of the user and/or terminal, network access, etc.

The operations to be performed by the FRXDRV 118 may be specified by way of one or more rules/assignments files 120. For example, an administrator can create a rule that specifies one or more objects to be hidden or changed (file, directory, key, or value) and any applicable conditions or trigger events. The administrator may then assign the rule to one or more specific user or groups of users. In some embodiments, rules may be stored in one file and corresponding assignments may be stored in another associated file. In other embodiments, rules and corresponding assignments may be stored in the same file. These and other methods for implementing rules and assignments will occur to those skilled in the art and are deemed to be within the scope of this disclosure.

Exemplary Processes

The following is a description of exemplary processes that may be executed by the various architectural components discussed above. As will be understood from discussions herein, the Rule/Assignment Editor 104, FRX.EXE 106, FRX Service 108, Rules/Assignment Files 120, and FRXDRV 118 may operate together (or alone) to complete all of the steps (or just some of the steps) discussed below.

For simplicity and brevity, but not for the purpose of limitation, these components will collectively be referred to as "the service," below.

Figure 2:
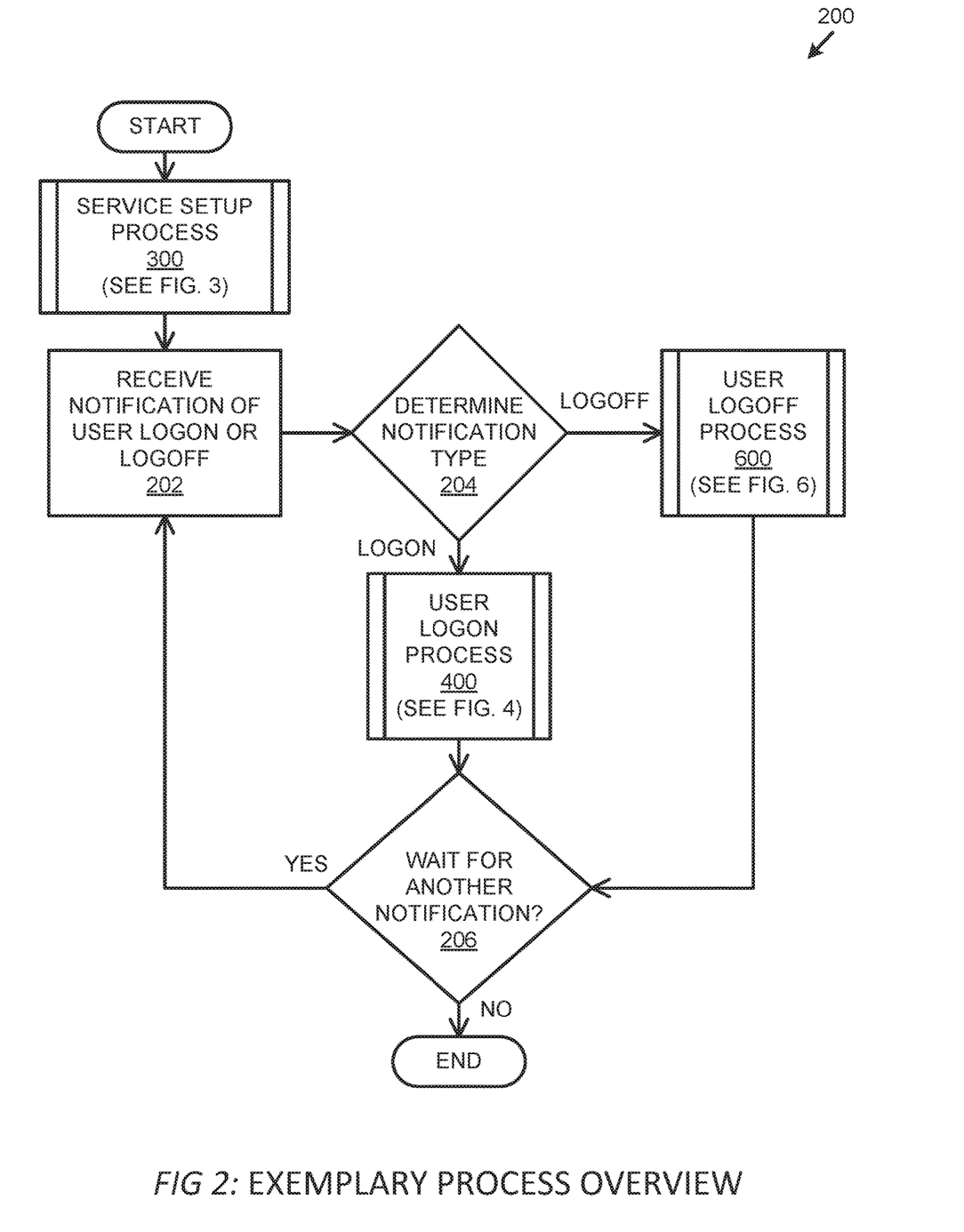
FIG. 2 is a flowchart of an exemplary process, according to one embodiment of the present disclosure.

Referring now to FIG. 2, an exemplary, high-level overview 200 of one embodiment of the disclosed process is shown. As will be understood and appreciated, the exemplary, high-level overview 200 shown in FIG. 2 represents merely one approach or embodiment of the present system, and other aspects are used according to various embodiments of the present system; the steps and processes shown in FIG. 2 (and those of all other flowcharts and sequence diagrams shown and described herein) may operate concurrently and continuously, are generally asynchronous and independent, and are not necessarily performed in the order shown.

Generally, the process 200 is the process by which the service presents that VHD to a software program or operating system as if the VHD was local to the electronic computing device on which the operating system is operating. By presenting the VHD in this manner, in various embodiments, the electronic computing device or a software program operating on the same may access the encapsulated file and/or folder. Thus, in various embodiments, the service is able to permit remote access to files that usually must be locally stored for proper operation. For example, the service may replace a MICROSOFT® OUTLOOK® data file that usually must be kept locally with a data file on the VHD so that MICROSOFT® OUTLOOK® may operate more efficiently.

In various embodiments, the process 200 begins with a service setup process 300 (further details of which will be discussed in association with the description of FIG. 3), wherein the service is started by the operating system (e.g., when the operating system starts after the electronic computing device is turned on) and registers with the same to receive notifications of user logon and logoff activity. After registering with the operating system, the service, in one embodiment, operates in the background of the operating system until the electronic computing device is turned off.

At step 202, in various embodiments, the service receives a notification of user logon or logoff activity from the operating system. Generally, this notification corresponds to either a user logging on to use the operating system (e.g., after turning on the electronic computing device) or logging off after using the operating system (e.g., before turning off the electronic computing device). Thus, in one embodiment, the service determines, at step 204, whether the notification is of a user logon or logoff (e.g., based on the header of the notification, the structure of the notification, etc.). If the notification is of a user logon, then, in one embodiment, the service proceeds to a user logon process 400 (further details of which will be discussed in association with the description of FIG. 4). In various embodiments, the user logon process 400 is the process by which the service determines the appropriate VHD to attach to the electronic computing device and makes the appropriate changes to the file paths of any original files/folders that the VHD is replacing. If, however, the notification is of a user logoff, then, in one embodiment, the service proceeds to a user logoff process 600 (further details of which will be discussed in association with the description of FIG. 6), wherein the VHD is detached and the original files/folders are restored to their original file paths.

After the user logon process 400 or user logoff process 600, in various embodiments, the service determines, at step 206, whether to wait for another notification based on one or more predefined rules. If the service determines, at step 206, to wait for another notification, then the service returns to step 202 and waits for the notification. In various embodiments, the service may wait for another notification because the previously-received notification was of a user logon and, thus, a user logoff notification is probably forthcoming or because the user has logged off of the operating system but not turned off the electronic computing device. If, however, the service determines, at step 206, not to wait for another notification (e.g., electronic computing device is being shut down, etc.), then the exemplary process over 200 ends thereafter.

Figure 3:
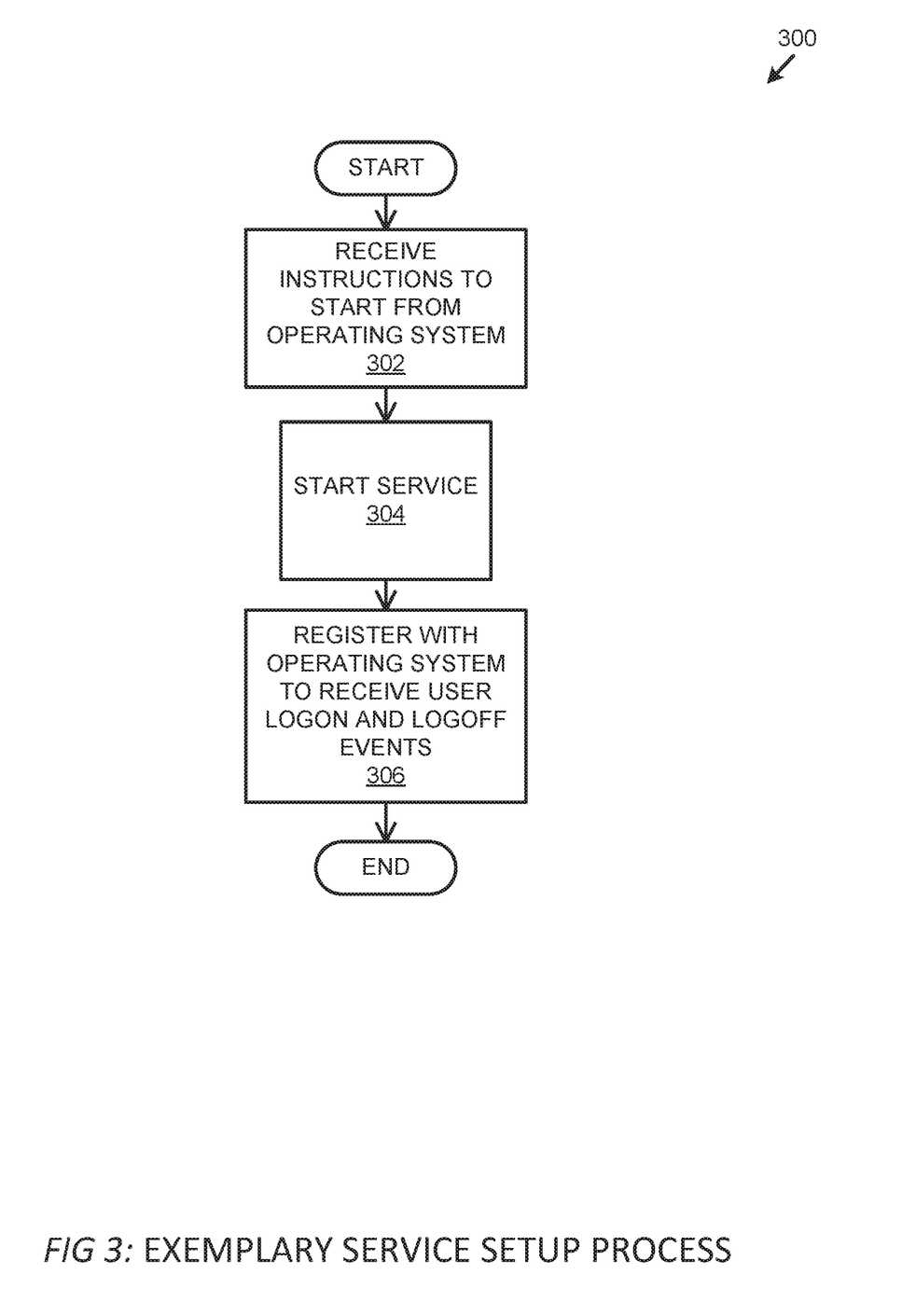
FIG. 3 is a flowchart of an exemplary process, according to one embodiment of the present disclosure.

Now referring to FIG. 3, an exemplary service setup process 300 is shown according to one embodiment of the present disclosure. Generally, the exemplary service setup process 300 is the process by which the service is started by the operating system (e.g., when the operating system starts after the electronic computing device is turned on) and registers with the same to receive notifications of user logon and logoff activity. Thus, in various embodiments, the exemplary service setup process 300 begins at step 302 when the operating system provides instructions to the service to start. In one embodiment, at step 304, the service starts upon receiving a specific prompt from the operating system. In some embodiments, step 302 is optional and the service starts automatically, at step 304, upon startup of the operating system. Generally, in various embodiments, the service operates in the background of the operating system hidden from the user of the same. After starting, in various embodiments, the service registers, at step 306, with the operating system to receive notification of user logon and logoff events, and the exemplary service setup process 300 ends thereafter. As will occur to one having ordinary skill in the art, this registration permits the service to know when to take certain actions (e.g., initiate processes, attach/detach VHD, etc.).

Figure 4:
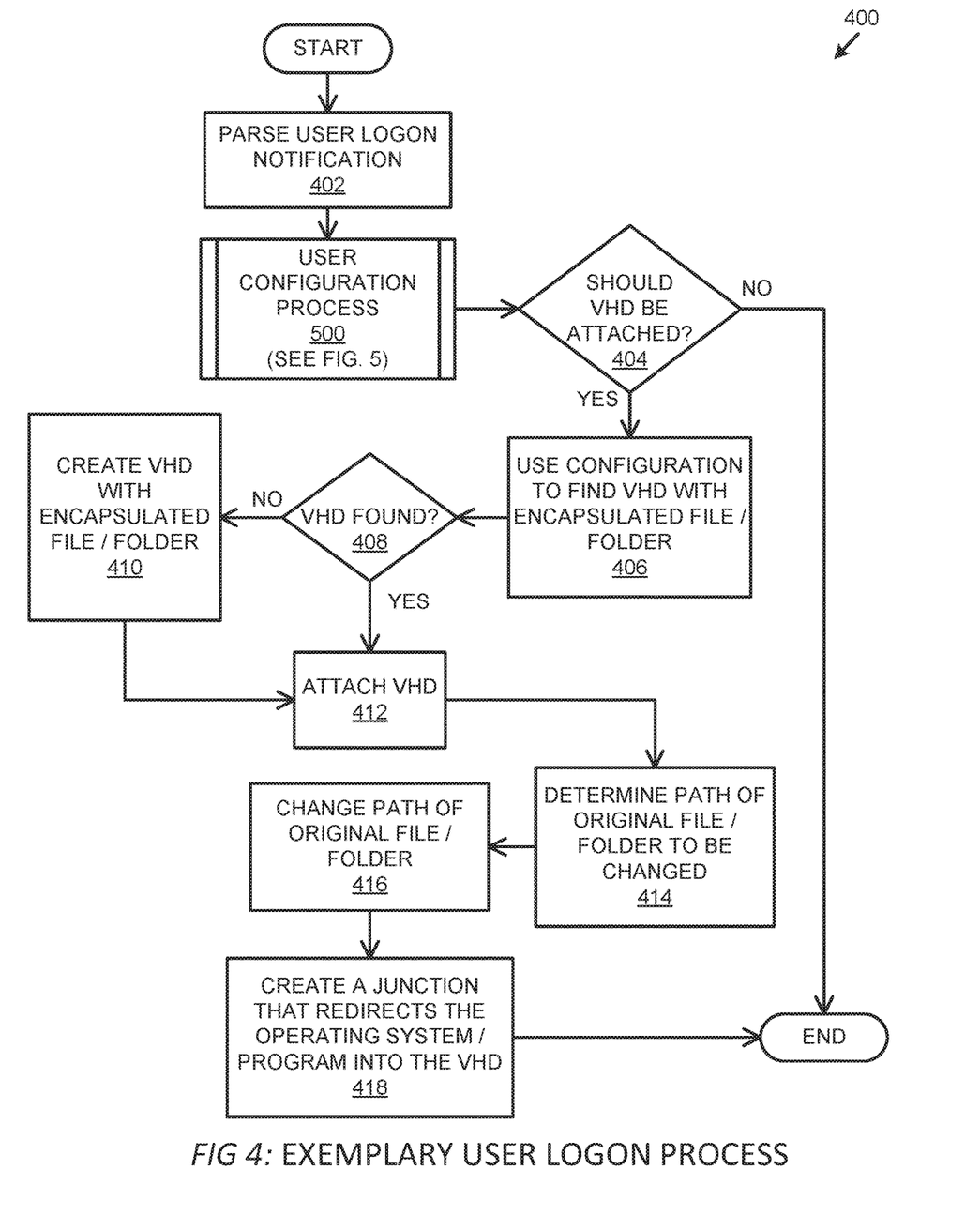
FIG. 4 is a flowchart of an exemplary process, according to one embodiment of the present disclosure.

Referring now to FIG. 4, an exemplary user logon process 400 is shown according to one embodiment of the present disclosure. Generally, the exemplary user logon process 400 is the process by which the service determines the appropriate VHD to attach to the electronic computing device and makes the appropriate changes to the file paths of any original files/folders that the VHD is replacing. For example, the service may encapsulate MICROSOFT® OUTLOOK® data files within the VHD and redirect the operating system from the MICROSOFT® OUTLOOK® data files located locally on a user's machine to the encapsulated files. Once redirected, MICROSOFT® OUTLOOK® can access the files within the VHD as if they were local to the electronic computing device on which the software is operating.

Thus, the exemplary user logon process 400 begins, in various embodiments, at step 402, wherein the service parses the user logon notification to retrieve the user identification corresponding to the user that is currently logged in to the operating system. Generally, the service may extract other data from the logon notification at step 402 as appropriate (e.g., time and date information for analytics purposes, IP address of electronic computing device for security purposes, etc.). In various embodiments, the service may use the data extracted/parsed from the user logon notification to determine, as part of a user configuration process 500 (further details of which will be discussed in association with the description of FIG. 5), whether to encapsulate a particular file for the user in a VHD.

Figure 5:
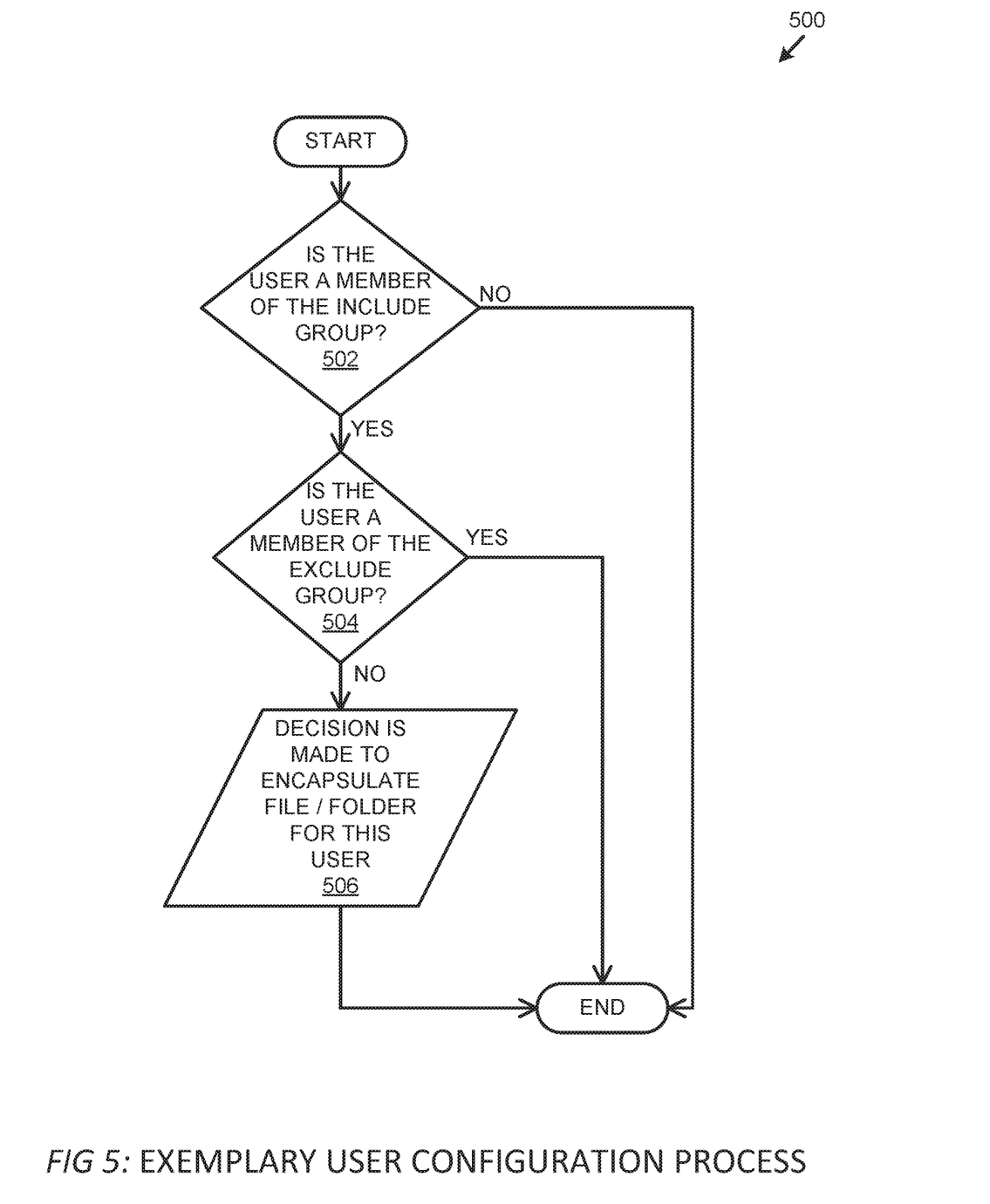
FIG. 5 is a flowchart of an exemplary process, according to one embodiment of the present disclosure.

At step 404, the service determines whether to attach a VHD, in one embodiment based on the results of the user configuration process 500. If the service determines, at step 404, not to attach a VHD, then the exemplary user logon process 400 ends thereafter. If, however, the service determines, at step 404, to attach a VHD, then the service proceeds to step 406. At step 406, in one embodiment, the service searches for the appropriate VHD (with the correct encapsulated file/folder) for the user, based on the results of the user configuration process 500. In one embodiment, a user is associated with a particular configuration that indicates which file(s)/folder(s) will be encapsulated on which VHD. In some embodiments, the service uses a lookup table to determine which VHD is associated with a particular user. Accordingly, at step 408, the service determines, in one embodiment, whether the appropriate VHD was found (at step 406). If the service determines at step 408 that the appropriate VHD was not found, then, in one embodiment, the service proceeds at step 410 to create the VHD with the encapsulated file/folder. For example, the service may create a VHD if the user who logged on to the operating system has never logged on previously, or if the user deleted a previously-created VHD. Generally, once attached, the VHD appears, to the electronic computing device, like any other attached file system (e.g., thumb drive, etc.), so the file/folder is stored within this file system, as part of step 410, according to methods known in the art to store files within a file system.

Generally, after creating the VHD at step 410 or if the service determines, at step 408, that the appropriate VHD was found (at step 406), then, in various embodiments, the service attaches the VHD to the electronic computing device, at step 412, so that the VHD may be accessed by the same. As will be understood, this disclosure places no limitations on the type of VHD, file/folders encapsulated within the VHD, operating system, electronic computing device, or method of attaching the VHD to the operating system/electronic computing device. By attaching the VHD, the user and/or electronic computing device may now access the files/folder encapsulated within the same. In one embodiment, the service uses application programming interfaces ("APIs") provided by the operating system to attach the VHD at step 412. For example, in Windows®, the service may use the following APIs: OpenVirtualDisk, CreateVirtualDisk, AttachVirtualDisk, DetachVirtualDisk, etc.

At step 414, the service determines, in various embodiments, the file path of the original file/folder that is to be replaced with the file(s)/folder(s) encapsulated within the attached VHD. Thus, at step 416, the service changes the file path of the original file/folder so that the software program that uses that original file/folder can no longer access the same. In various embodiments, the original file/folder is essentially "hidden" from the software program/operating system/user but has not been deleted, so it could still be used, if its location was known (e.g., by renaming the path by adding a ".hold" or other method). In various embodiments, at step 418, the service creates a junction (e.g., junction point, etc.) that redirects the operating system/software program to the VHD. Generally, the junction makes the VHD appear as if it is located at the original file path of the original file/folder (determined at step 414). Thus, the files/folders encapsulated on the VHD appear to be the original file(s)/folder(s) located local to the electronic computing device. After creating the junction, the exemplary user logon process 400 ends thereafter.

Now referring to FIG. 5, an exemplary user configuration process 500 is shown according to one embodiment of the present disclosure. The exemplary user configuration process 500 is the process by which the service determines whether to encapsulate a file/folder for the user that has just logged on to the operating system. Thus, at step 502, in one embodiment, the service determines whether the user is a member of the include group. If the user is not a member of the include group, then, in one embodiment, the exemplary user configuration process 500 ends thereafter. If, however, the user is a member of the include group, then the service determines, at step 504, in one embodiment, whether the user is a member of the exclude group. If the user is a member of the exclude group, then, in one embodiment, the exemplary user configuration process 500 ends thereafter. For example, an administrator may have included "all users" in the include group but decided that "board members" should be in the exclude group (instead of trying to individually select all users except the board members to initially populate the include group). If, however, the user is not a member of the exclude group, then the service determines, at step 506, in one embodiment, whether to encapsulate a file/folder for this user according to one or more predefined rules, and the exemplary user configuration process 500 ends thereafter. In one embodiment, not shown in FIG. 5, the service also generates, at step 506, the configuration that designates the particular file(s)/folder(s) to be encapsulated on the particular VHD (used by the service at step 406 in FIG. 4).

Figure 6:
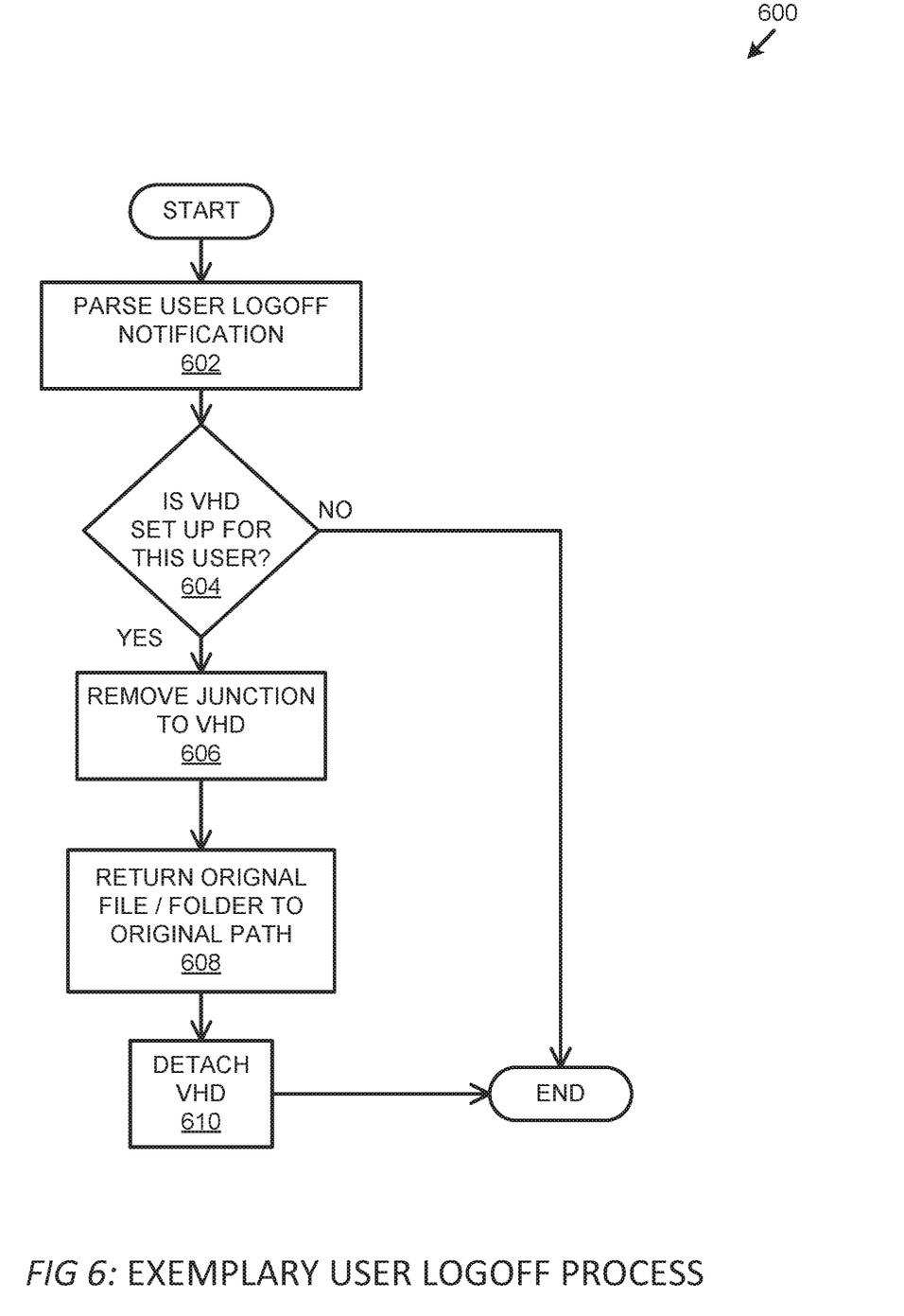
FIG. 6 is a flowchart of an exemplary process, according to one embodiment of the present disclosure.

Referring now to FIG. 6, an exemplary user logoff process 600 is shown according to one embodiment of the present disclosure. Generally, the exemplary user logoff process 600 is the process by which the service detaches the VHD (that was attached as part of the exemplary user logon process 400) and restores the original files/folders to their original file paths (that were changed from their original file paths as part of the exemplary user logon process 400).

Thus, the exemplary user logoff process 600 begins, in various embodiments, at step 602, wherein the service parses the user logoff notification to retrieve the user identification corresponding to the user that is currently logging off of the operating system. Generally, the service may extract other data from the logon notification at step 602 as appropriate (e.g., time and date information for analytics purposes, etc.). In one embodiment, the service does not conduct step 602 as it is already aware of the user's identity from the exemplary user logon process 400. In various embodiments, the service may use the data extracted/parsed from the user logoff notification to determine, at step 604, whether a VHD is set up for this user. In one embodiment, the service may, at step 604, run diagnostics on the operating system/electronic computing device to determine whether a VHD is currently attached to the same. If a VHD is not attached, then, in one embodiment, the exemplary user logoff process 600 ends thereafter. If, however, a VHD is attached, then, in one embodiment, at step 606, the service removes the junction (generated at step 418 in FIG. 4) to the VHD so that the software program/operating system can no longer access the VHD and the files/folders encapsulated thereon as if they were the original file/folders. After removing the junction, in various embodiments, at step 608, the service returns the original file/folder to its original file path (which was removed from the same at step 416 in FIG. 4) so that the operating system/software program may access the original file/folders. In various embodiments, the service detaches the VHD at step 610 so that it is no longer accessible to the electronic computing device. After detaching the VHD at step 610, the exemplary user logoff process 600 ends thereafter.

ALTERNATE EMBODIMENTS

According a first aspect, a computer-implemented method for more efficiently accessing large data sets in a virtual computing environment, the computer-implemented method implemented by one or more processors and including the steps of: i) receiving instructions from the operating system to start a particular service; ii) registering the particular service with the operating system to receive user logon and logoff events at a local computer; iii) upon receiving an indication of a particular user logon event by the particular service, determining whether the particular user is a member of an include group; iv) in response to determining that the particular user is a member of the include group, encapsulating a particular file associated with the particular program in a virtual hard drive; v) attaching the virtual hard drive at the local computer; vi) determining an original path of the particular file; vii) changing the original path of the particular file to a new path to hide the particular file; viii) creating a junction at the original path of the particular file that redirects the particular program to the particular file encapsulated in the virtual hard drive; and xi) upon receiving notification of a user logoff event, removing the junction, changing the new path to the original path, and detaching the virtual hard drive from the local computer.

According to a second aspect, the computer-implemented method of any other aspect, wherein the one or more processors include at least one processor at a server, the at least one processor configured for implementing steps i-iv of the first aspect.

According to a third aspect, the computer-implemented method of any other aspect, wherein the one or more processors include a local processor at a local computer, the local computer in operative communication with the server, the local processor configured for implementing steps v-ix of the first aspect.

According to a fourth aspect, the computer-implemented method of any other aspect, wherein the one or more processors operate a virtual desktop environment on the local computer.

According to a fifth aspect, the computer-implemented method of any other aspect, wherein the one or more processors operate a virtual program on the local computer.

According to a sixth aspect, the computer-implemented method of any other aspect, wherein the virtual program is an email and/or calendar program.

According to a seventh aspect, the computer-implemented method of any other aspect, wherein steps i-ix of the first aspect are implemented by the operating system, wherein the operating system is a virtual operating system operating on the local computer.

According to an eighth aspect, the computer-implemented method of any other aspect, wherein the particular file is an .OST file.

According to a ninth aspect, a computer system for more efficient file sharing between computing systems in a virtual environment, the computer system including one or more processors operatively connected to at least one database, the at least one database storing an operating system and a particular program, one or more processors configured for: i) receiving instructions from the operating system to start a particular service; ii) registering the particular service with the operating system to receive user logon and logoff events at a local computer; iii) upon receiving an indication of a particular user logon event by the particular service, determining whether the particular user is a member of an include group; iv) in response to determining that the particular user is a member of the include group, encapsulating a particular file associated with the particular program in a virtual hard drive; v) attaching the virtual hard drive at the local computer; vi) determining an original path of the particular file; vii) changing the original path of the particular file to a new path to hide the particular file; viii) creating a junction at the original path of the particular file that redirects the particular program to the particular file encapsulated in the virtual hard drive; and ix) upon receiving notification of a user logoff event, removing the junction, changing the new path to the original path, and detaching the virtual hard drive from the local computer.

According to a tenth aspect, the system of any other aspect, wherein the one or more processors include at least one processor at a server, the at least one processor configured for implementing steps i-iv of the ninth aspect.

According to an eleventh aspect, the system of any other aspect, wherein the one or more processors include a local processor at the local computer, the local computer in operative communication with the server, the local processor configured for implementing steps v-ix of the ninth aspect.

According to a twelfth aspect, the system of any other aspect, wherein the one or more processors operate a virtual desktop environment on the local computer.

According to a thirteenth aspect, the system of any other aspect, wherein the one or more processors operate the particular program virtually on the local computer.

According to a fourteenth aspect, the system of any other aspect, wherein the virtual program is an email and/or calendar program.

According to a fifteenth aspect, the system of any other aspect, wherein steps i-ix are implemented by the operating system, wherein the operating system is a virtual operating system operating on the local computer.

According to a sixteenth aspect, a computer-implemented method for improving computing functionality by reduction of network traffic, the computer-implemented method including providing a service operative on a computing system with a memory storing an operating system and at least one processor for executing computer-implemented instructions of the operating system, wherein the service is configured for: i) receiving a request to attach a virtual hard drive including a VHD file, the VHD file associated with a program to be run on a user's computing device; ii) attaching the virtual hard drive to the user's computing device; iii) determining a target file to be changed, the target file associated with the program to be run on the user's computing device; iv) changing the path of the target file such that it is hidden from the operating system; and v) upon receiving an indication from the operating system to run the program, directing the operating system to access the VHD file.

According to a seventeenth aspect, the computer-implemented method of any other aspect, wherein the service is further configured for encapsulating the VHD file within the virtual hard drive.

According to an eighteenth aspect, the computer-implemented method of any other aspect, wherein encapsulating the VHD within the virtual hard drive includes generating a container for the VHD.

According to a nineteenth aspect, the computer-implemented method of any other aspect, wherein attaching the virtual hard drive includes persisting the virtual hard drive on a file system at the user's computing device.

According to a twentieth aspect, the computer-implemented method of any other aspect, wherein directing the operating system to access the VHD file includes creating a junction between the path of the target file and VHD file, whereby the operating system accesses the VHD file upon attempting to access the target file.

According to a twenty-first aspect, the computer-implemented method of any other aspect, wherein the junction includes a memory location of the VHD file.

According to a twenty-second aspect, the computer-implemented method of any other aspect, wherein the request to attach the virtual hard drive is associated with the logon of the user.

According to a twenty-third aspect, the computer-implemented method of any other aspect, wherein the logon of the user is for logging onto a virtual desktop.

According to a twenty-fourth aspect, the computer-implemented method of any other aspect, wherein the service is further configured for detaching the virtual hard drive upon receiving an indication of the user logging off.

According to a twenty-fifth aspect, the computer-implemented method of any other aspect, wherein the service is further configured for changing the path of the target file such that it is no longer hidden from the operating system upon receiving the indication of the user logging off.

According to a twenty-sixth aspect, the computer-implemented method of any other aspect, wherein the service is further configured for communicating with a registry of the operating system.

According to a twenty-seventh aspect, the computer-implemented method of any other aspect, wherein the service is configured for intercepting input/outputs of the registry.

According to a twenty-eighth aspect, the computer-implemented method of any other aspect, wherein a registry filter driver is configured for handling the intercepted inputs/outputs of the registry.

According to a twenty-ninth aspect, the computer-implemented method of any other aspect, wherein the registry filter driver is located in kernel space on the user's computing device.

According to a thirtieth aspect, the computer-implemented method of any other aspect, wherein changing the path of the target file includes changing the path to include .hold.

According to a thirty-first aspect, a computer system for eliminating or reducing network traffic, the computer system including a memory storing an operating system and at least one processor for executing a file registry and filter driver (FRXDVR), the FRXDVR connected to a system registry of the operating system and configured for intercepting input/output requests of the system registry, wherein the FRXDVR is further configured for: i) hiding a target file located at a target file location; and ii) creating a junction from the target file location to a new file located on a virtual hard drive, whereby the operating system accesses the new file location upon request from a particular program to access the target file.

According to a thirty-second aspect, the computer system of any other aspect, wherein the target file is an OST file.

According to a thirty-third aspect, the computer system of any other aspect, wherein the junction includes a memory location of the new file on the virtual hard drive.

According to a thirty-fourth aspect, the computer system of any other aspect, wherein the new file is encapsulated on the virtual hard drive.

According to a thirty-fifth aspect, the computer system of any other aspect, wherein encapsulating the new file on the virtual hard drive includes generating a container for the new file.

According to a thirty-sixth aspect, the computer system of any other aspect, wherein the FRXDVR hides the target file by changing the filename of the folder that includes the target file.

According to a thirty-seventh aspect, the computer system of any other aspect, wherein changing the filename of the folder that includes the target file includes adding .hold to end of the filename.

According to a thirty-eighth aspect, the computer system of any other aspect, wherein the FRXDVR attaches the virtual hard drive to the computer system in response to a notification of a logon of a particular user.

According to a thirty-ninth aspect, the computer system of any other aspect, wherein the logon of a particular user is for logging onto a virtual desktop.

According to a fortieth aspect, the computer system of any other aspect, wherein the FRXDVR is configured to detach the virtual hard drive from the computer system in response to a notification of a logoff of the particular user.

According to a forty-first aspect, the computer system of any other aspect, wherein the FRXDVR is configured to change the filename of the folder that includes the target file in response to the notification of the logoff of the particular user.

According to a forty-second aspect, the computer system of any other aspect, wherein the FRXDVR is located in kernel space on the computer system.

CONCLUSION

Many modifications and other embodiments of the systems and methods disclosed herein may come to mind to one skilled in the art to which this invention pertains having the benefit of the teachings presented in the foregoing descriptions and the associated drawings. While examples discussed above cover the use of the disclosed systems and methods in the context of MICROSOFT® OUTLOOK® data file, the systems and methods described herein may be used in any other suitable context. Therefore, it is to be understood that the systems and methods described herein are not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented method for improving computing functionality by reduction of network traffic, the computer-implemented method comprising providing a service operative on a computing device with a memory storing an operating system and at least one processor for executing computer-implemented instructions of the operating system, wherein the service is configured for:
receiving a request to attach a virtual hard drive (VHD) comprising a VHD file, the VHD file associated with a program to be run on the computing device;
attaching the virtual hard drive to the computing device;
determining a target file to be changed, the target file associated with the program to be run on the computing device;
changing a path of the target file such that it is hidden from the operating system; and
upon receiving an indication from the operating system to run the program, directing the operating system to access the VHD file.

2. The computer-implemented method of claim 1, wherein the service is further configured for encapsulating the VHD file within the virtual hard drive.

3. The computer-implemented method of claim 1, wherein directing the operating system to access the VHD file comprises creating a junction between the path of the target file and VHD file, whereby the operating system accesses the VHD file upon attempting to access the target file.

4. The computer-implemented method of claim 3, wherein the request to attach the virtual hard drive is associated with a logon of a user.

5. The computer-implemented method of claim 4, wherein the service is further configured for detaching the virtual hard drive upon receiving an indication of the user logging off.

6. The computer-implemented method of claim 5, wherein the service is further configured for changing the path of the target file such that it is no longer hidden from the operating system upon receiving the indication of the user logging off.

7. The computer-implemented method of claim 1, wherein the service is further configured for communicating with a registry of the operating system.

8. The computer-implemented method of claim 7, wherein the service is configured for intercepting input/outputs of the registry.

9. A computing system, comprising:
at least one processor; and
a memory storing instructions which, when executed by the at least one processor, cause the at least one processor to execute a service configured to
receive a request to attach a virtual hard drive (VHD) comprising a VHD file, the VHD file associated with a program to be run on the computing system,
attach the virtual hard drive to the computing system,
determine a target file to be changed, the target file associated with the program to be run on the computing system,
change a path of the target file such that it is hidden from an operating system executing on the computing system, and
upon receiving an indication from the operating system to run the program, direct the operating system to access the VHD file.

10. The computing system of claim 9, wherein the service is further configured for encapsulating the VHD file within the virtual hard drive.

11. The computing system of claim 9, wherein directing the operating system to access the VHD file comprises creating a junction between the path of the target file and VHD file, whereby the operating system accesses the VHD file upon attempting to access the target file.

12. The computing system of claim 11, wherein the request to attach the virtual hard drive is associated with a logon of a user.

13. The computing system of claim 12, wherein the service is further configured for detaching the virtual hard drive upon receiving an indication of the user logging off.

14. The computing system of claim 13, wherein the service is further configured for changing the path of the target file such that it is no longer hidden from the operating system upon receiving the indication of the user logging off.

15. The computing system of claim 9, wherein the service is further configured for communicating with a registry of the operating system.

16. The computing system of claim 15, wherein the service is configured for intercepting input/outputs of the registry.

17. A memory storing instructions which, when executed by at least one processor, cause the at least one processor to execute a service configured to:
receive a request to attach a virtual hard drive (VHD) comprising a VHD file, the VHD file associated with a program to be run on a computing system;
attach the virtual hard drive to the computing system;
determine a target file to be changed, the target file associated with the program to be run on the computing system;
change a path of the target file such that it is hidden from an operating system executing on the computing system; and
upon receiving an indication from the operating system to run the program, direct the operating system to access the VHD file.

18. The memory of claim 17, wherein the service is further configured for encapsulating the VHD file within the virtual hard drive.

19. The memory of claim 17, wherein directing the operating system to access the VHD file comprises creating a junction between the path of the target file and VHD file, whereby the operating system accesses the VHD file upon attempting to access the target file.

20. The memory of claim 17, wherein the request to attach the virtual hard drive is associated with a logon of a user.

* * * * *